United States Patent [19]
Johne

[11] Patent Number: 4,632,609
[45] Date of Patent: Dec. 30, 1986

[54] ROTARY CUTTING TOOL

[75] Inventor: Frank Johne, Lohne, Fed. Rep. of Germany

[73] Assignee: J. Kuhn GmbH & Co. Prazisionswerkzeug K.G., Dorsten, Fed. Rep. of Germany

[21] Appl. No.: 684,252

[22] Filed: Dec. 20, 1984

[51] Int. Cl.$^4$ ............................................. B23B 29/02
[52] U.S. Cl. .................................... 408/197; 408/231; 408/713; 407/31
[58] Field of Search ............... 408/186, 197, 200, 231, 408/233, 713; 407/37, 45, 46, 76, 88, 95

[56] References Cited

U.S. PATENT DOCUMENTS

| | | | |
|---|---|---|---|
| 3,946,474 | 3/1976 | Hahn et al. | 407/37 |
| 4,043,697 | 8/1977 | Eckle | 408/233 X |
| 4,101,239 | 7/1978 | Wohlhaupter | 408/182 |
| 4,510,829 | 4/1985 | Kintzel et al. | 82/36 R |

FOREIGN PATENT DOCUMENTS 2533495 1/1977 Fed. Rep. of Germany .
1549215 7/1979 United Kingdom .

OTHER PUBLICATIONS

Magazine "Maschinenmarkt", 1977, pp. 1409–1412.

Primary Examiner—James M. Meister
Assistant Examiner—John L. Knoble
Attorney, Agent, or Firm—Holman & Stern

[57] ABSTRACT

To achieve reliable fastening of a toothed cutter carrier on the toothed bearing surface of a tool body, and to achieve favorable force ratios, in a rotary cutting tool, in particular a drilling head, the tooth formation of the bearing surface is constructed in a sawtooth shape with steep tooth flanks and inclined tooth flanks, the steep tooth flanks being disposed substantially on that side of the teeth which is orientated towards the cutting element of the cutter carrier. The tooth formation on the cutter carrier is constructed so that it is substantially similar to the tooth formation of the bearing surface for interengagement therewith.

14 Claims, 8 Drawing Figures

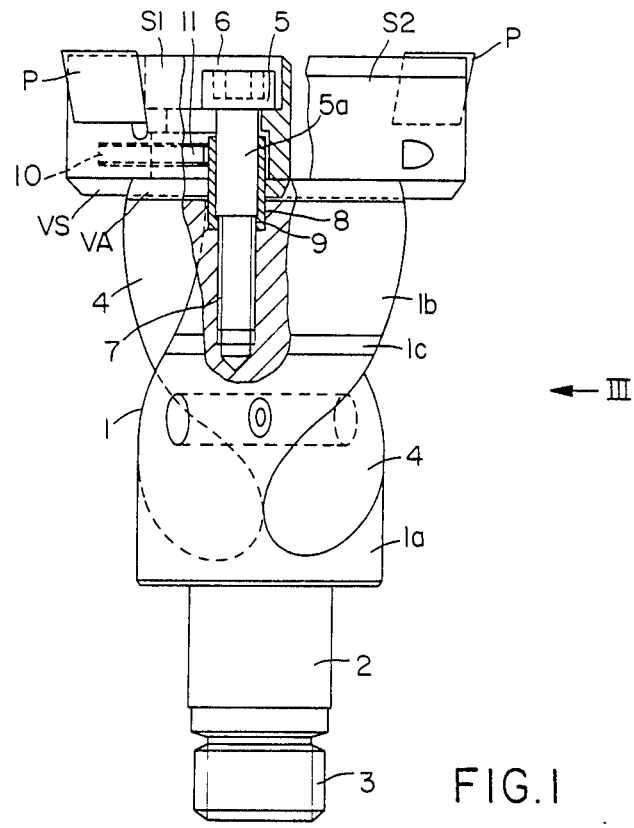
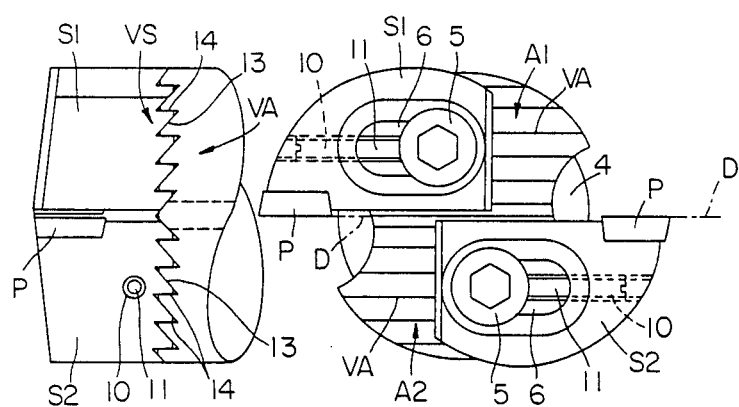

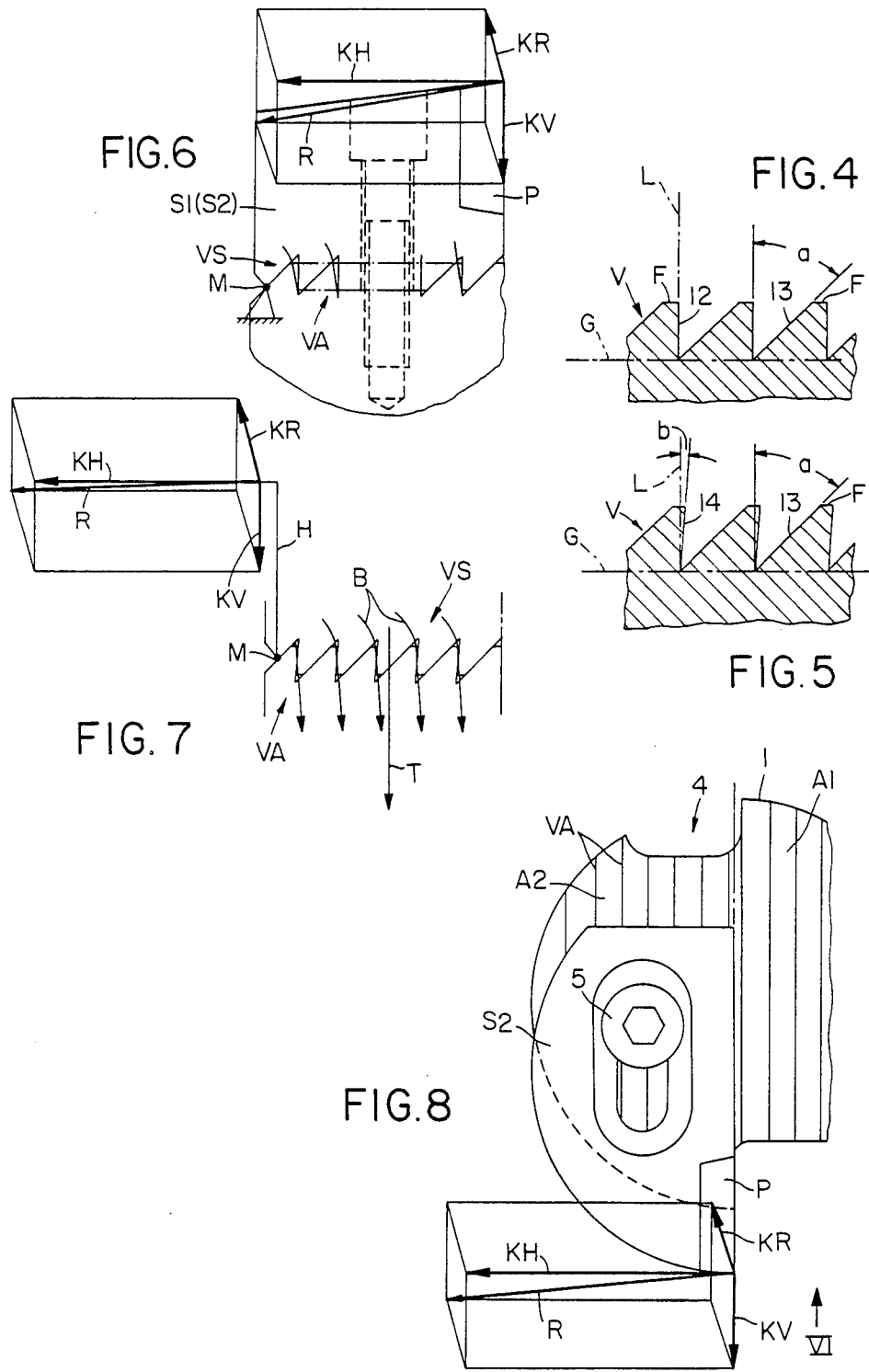

ROTARY CUTTING TOOL

BACKGROUND OF THE INVENTION

1. Field of the Invention

The invention relates to a rotary cutting tool, such as a drilling head or the like, and more particularly concerns a rotary cutting tool comprising a tool body having a bearing surface, at least one cutter carrier, a cutting element at one end of the, or each, cutter carrier, and a fastening screw means for clamping the, or each, cutting element to the bearing surface of the tool body, the bearing surface being provided with a tooth formation which extends transversely to the longitudinal axis of the tool body and the underside of the cutter carrier being provided with a tooth formation engageable with the tooth formation on the bearing surface.

2. Description of the Prior Art

Drilling heads constructed as so-called double cutters for drilling out drill holes are known, in which two cutter carriers are each radially displaceable and can be be secured in the adjusted position with one or two fastening screws. The bearing surface for the cutter carrier on the tool body is in this case often provided with a tooth formation, with which a corresponding tooth formation on the underside of the cutter carrier engages. Bearing surfaces of this type for cutter carriers in known designs either have a similar tooth formation on the front end of a tool body for both cutter carriers or there are toothed bearing surfaces at an angle to one another. The fastening screw, which either penetrates an oblong hole in the cutter carrier and is screwed into a borehole in the tool body or passes through a round hole in the cutter carrier and then engages in a nut which is displaceable in the tool body, is always perpendicular to the toothed bearing surface. The tooth formation has in all cases a symmetrical design, i.e. both flanks of a tooth are in each case at the same angle relative to a median plane.

The tooth formation together with the fastening screw must transmit the forces occurring in the cutting process from the cutter carrier to the tool body. As has been seen, considerable effects of force occur partly in this connection, which tend to shift the cutter carrier out of the tooth formation. Furthermore, the main cutting force or the resultant from the cutting forces, in particular the main cutting force and advancing force, particularly in the case of cutter carriers displaced radially outwards to varying degrees, causes bending of the cutter carrier. The result of this is that the cutter carrier moves upwards on its bearing surface and when the force subsides springs immediately downwards again, which leads to vibration during machining.

The cutter carriers are often very narrow, and tilting then occurs which is caused by the main force and which exerts considerable tensile stress upon the fastening screw. If the distance of the cutting plate from the displacement plane of the cutter carrier is relatively large, a large bending moment must be absorbed by the fastening screws when loads occur. Such large moments can under certain circumstances even lead to a lengthening of the screws, which can result in a loosening of the cutter carrier and thus destroy the tool. The existing narrowed spatial conditions in tools of the type in question and limits in the material strength are considerable obstacles, which hitherto prevented a satisfactory solution.

SUMMARY OF THE INVENTION

The object of the invention is to overcome the disadvantages and shortcomings and to create a tool of the type described above, in which the toothed cutter carrier can be fastened on the toothed bearing surface of a tool as securely as possible and favorable force ratios can be achieved. The invention also aims, in this case, for an advantageous design of the tool in detail. This also applies to the positioning of the cutter carrier relative to the tool body. Further problems connected with this, with which the invention is concerned, will be evident from the explanation of the solution indicated in each case.

According to the invention, in the case of a tool of the type described, the tooth formation of the bearing surface for the cutter carrier is sawtooth-shaped with steep and inclined tooth flanks, the steep tooth flanks being essentially disposed on the side orientated towards the cutting element of the held cutter carrier.

In a design of this type, satisfactory abutments for the opposite teeth of the cutter carrier result from saw teeth under the action of the main cutting force or a force resulting from the cutting forces. The cutter carrier is pressed by means of the main cutting force firmly into the seat, which the tooth formation forms. The advancing force reinforces this effect. If the tooth formation of the bearing surface extends over the entire width of the tool body, as provided for in accordance with a preferred embodiment, additional security is obtained. Furthermore, as a result of the design and arrangement of the tooth formation a tilting moment, generated by the cutting forces, is kept so low that even a standard screw, used as a fastening screw, can withstand with a high degree of safety the stresses which then still occur.

The steep tooth flanks of the tooth formation can be orientated perpendicularly to the datum plane. It is particularly advantageous, however, for the tooth formation on the steep tooth flanks to be undercut, i.e. to be at an angle which deviates from the perpendicular. This undercutting angle can be selected within relatively broad limits. According to an embodiment it can even be 10° or more. In a highly expedient embodiment the undercutting angle lies within a range which includes the values above 0° up to 8°. The undercutting angle is, in particular, approximately 5°.

The reliable absorption of all stresses occurring is additionally promoted by undercutting on the steep tooth flanks. In this connection, a secure grip as it were is made possible.

The angle of inclination of the inclined flanks of the tooth formation in relation to the perpendicular to the datum plane of the bearing surface can be selected to a great extent according to the circumstances in each case. Preferred values for the said angle of inclination are in the range of between approximately 40° and 50°. In particular, an angle of inclination of approximately 45° is advantageous.

As a matter of expedience at least in one of the tooth formations, and preferably in both, the teeth are truncated, so that there are no pointed edges, but instead the tooth heads have small end faces.

The tooth formation on the cutter carrier does not necessarily have to be completely identical to the tooth formation on the bearing surface, but is expediently constructed so that it is at least substantially similar to the latter. This not only applies to the angles of the tooth flanks, but also to other details.

The tool is expediently constructed in such a manner that the tooth formation of the bearing surface is disposed on an end face of the tool body orientated transversely to the longitudinal axis of the latter, as is known per se.

If a so-called double cutter is involved, to which the invention relates particularly and in which there are two cutter carriers radially adjustable independently of one another in opposite direction, an advantageous embodiment consists in that tooth formations with opposite orientation of the tooth flanks are arranged as bearing surfaces at the front end of the tool body in two areas directly adjacent to one another. Optimum use is thus made of the available surface and a secure retaining device with favorable absorption of stress forces for each cutter carrier is made possible.

The tooth formations are advantageously finished by grinding or even produced entirely by grinding, in particular deep grinding.

An advantageous further refinement of the tool, in which a positioning or fine-adjustment screw is disposed in the cutter carrier, consists in that a sleeve, on which the fine-adjustment screw orientated transversely thereto is supported with its end, is arranged on a cylindrical part of the fastening screw for the cutter carrier. The sleeve is expediently inserted by its lower end into a receiving recess in the tool body, which is provided above the thread for screwing in the fastening screw. The oblong hole in the cutter carrier can be constructed without difficulty in such a manner that it provides space for the sleeve disposed on the fastening screw.

Further details, features and advantages of the invention will be apparent from the following description of embodiments, the accompanying drawings and the claims.

BRIEF DESCRIPTION OF THE DRAWINGS

FIG. 1 is a side elevational view of one embodiment of a tool according to the invention, partially dismantled and cut away, FIG. 2 is a top plan view of the tool shown in FIG. 1, FIG. 3 is another side view in the direction of the arrow III in FIG. 1 of the upper part of the tool, FIG. 4 is an enlarged cross-sectional view through the tooth formation of another embodiment, FIG. 5 is an enlarged cross-sectional view through the tooth formation of yet another embodiment, FIG. 6 is a diagrammatic view of the engagement of the cutter carrier and tool body, showing force effects, FIG. 7 is a further diagrammatic view, and FIG. 8 shows the force ratios in a simplified plan view.

DESCRIPTION OF PREFERRED EMBODIMENTS

The tool shown in FIGS. 1 to 3 is a so called double cutter, i.e. a drilling head for the internal machining of bore holes, for example for rough machining. A tool body designated as a whole by the numeral 1 has a cylindrical projection 2 and a a threaded part 3, by means of which it can be introduced into a retaining device, e.g. a receiving body, and secured therein. The tool body 1 itself has a rear cylindrical part 1a and front part 1b with a larger diameter. Both parts are cylindrical in basic design, the transition being designated by the numeral 1c. The front end face of the tool body 1 only deviates from the circular form insofar as two flutes 4 open into it and extend advantageously in a helical manner to a position near to the rear end of the rear part 1a.

The front face of the tool body 1 is in this case divided by a diameter line D passing through the centers of the openings of the flutes 4 into two areas which are directly adjacent to one another and each of which forms a bearing surface A1 and A2 for a cutter carrier S1 or S2. In this embodiment each cutter carrier is provided at the end with a cutting plate P, which can be fastened in the usual way, whether by clamps, welding, by means of a screw or in another suitable manner. This is not shown in detail. Any other cutting element can be provided on the cutter carrier instead.

Each cutter carrier S1, S2 can be secured with a fastening screw 5 to the tool body. The fastening screw 5 in each case passes through an oblong hole 6 in the cutter carrier and is screwed into a thread 7 in the tool body. At the upper end of the thread a cylindrical seat 8 is provided for a sleeve 9, which surrounds a cylindrical part 5a of the screw 5. A positioning or fine adjustment screw 11, which is supported with its end on the sleeve 9, is provided transversely to the screw axis in a threaded bore 10 of each cutter carrier S1 or S2. The oblong hole 6 in each cutter carrier is constructed in such a manner that it provides corresponding space for the sleeve 9. The screw head is arranged with its underside, in the usual manner, on a bearing surface which surrounds the oblong hole 6.

Each bearing surface A1 and A2 is provided with a sawtooth-shaped tooth formation VA. The undersides of the cutter carriers S1 and S2 have respective tooth formations VS, which come together in close engagement with tooth formations VA when the cutter carrier is secured to the bearing surface by means of the fastening screw.

In FIG. 4 an embodiment of the sawtooth-shaped tooth formation V is shown, in which the steep tooth flanks 12 extend perpendicularly to a datum plane G of the bearing surface. Any plane, which extends through similar parts of the teeth or a plane parallel thereto, should be regarded as a datum plane. In the embodiment according to FIG. 4 the inclined tooth flanks 13 have an angle of inclination a of 45° with reference to a plane L perpendicular to the datum plane G.

FIG. 5 shows a further embodiment of the tooth formation V in a view corresponding to FIG. 4. In this case the tooth formation is advantageously undercut, in such a manner that the steep tooth flanks 14 enclose with the plane L perpendicular to the datum plane G an undercut angle b, which is in particular in the range of up to 8° and is preferably 5°. The angle of inclination a of the inclined tooth flanks 13 may, in the embodiment according to FIG. 4, be approximately 45° or, on the other hand, have a different value.

The teeth are in each case truncated, so that there are no sharp edges or points, although there are small end faces F (cf. FIGS. 4 and 5).

In FIGS. 6 and 8, the force ratios are illustrated, partially diagrammatically, in an undercut tooth formation of the type shown in FIG. 5, the views in FIGS. 6 and 7 being seen approximately in the direction of the arrow VI in FIG. 8. In the cutting process the main cutting force KH, the advancing movement force KV and the reverse force KR act upon the cutting edge of the cutting element P. The resultant from these forces is designated by the letter R. It can be seen that the tooth formation VS of the cutter carrier is held rigidly against the tooth formation VA of the bearing surface by the incident forces or is even additionally pressed against it. The cutting forces are thus themselves employed in order to provide the cutter carrier with a secure hold.

Even a tilting moment cannot cause damage. The point, about which the cutter carrier could tip, is the outermost bearing point of the cutter carrier on the tool carrier, which is designated in FIGS. 6 and 7 by M. In FIG. 7 the parallelogram of forces in comparison with FIG. 6 is shifted to the left from the cutting edge of the cutting element P, the decisive force acting upon a lever arm H. During pivoting about point M caused by a moment of this type, the individual parts of the tooth formation VS on the cutting element would have to describe circular paths, as shown in FIG. 7 and designated by the letter B. This would, however, press the steep tooth flanks even more rigidly against one another, and in practice force the teeth into one another, so that no tipping can occur, which could have disadvantageous consequences. The tightening force T of the fastening screw 5 is able, without risk of bending of the latter, to produce a counter moment for the tipping forces.

All the features mentioned in the foregoing description or represented in the drawings should, insofar as the prior art will allow, be regarded, either individually or in combination, as being embraced by the scope of the invention.

I claim:

1. In a rotary cutting tool having a tool body with a longitudinal axis of rotation and a front face, a bearing surface on the front face of the tool body, at least one cutter carrier having a cutter thereon and an underside engaging against the bearing surface on the tool body, cooperatively interengaging tooth formations on the bearing surface of the tool body and on the underside of the at least one cutter carrier in the form of parallel teeth extending in a direction at right angles to a plane in which the axis of rotation of the cutting tool lies so that the at least one cutter carrier is adjustable with respect to the front face of the tool body in a direction parallel to the direction in which the teeth extend and guided by the teeth, an oblong hole through at least one cutter carrier, and a clamping screw having a shank extending through the oblong hole and engaging in a cooperating threaded hole in the tool body for clamping the at least one cutter carrier in any adjusted position, the improvement wherein:

said teeth have a cross-sectional shape in the form of saw teeth having steep tooth flanks with respect to a datum plane of the bearing surface, said steep tooth flanks on the tool body being on the side of the teeth facing in the direction of the median plane of the tool body in which the axis of rotation lies and which passes through the bearing surface parallel to the direction in which the teeth extend, and inclined tooth flanks on the other side of the teeth extending at a substantially lesser angle with respect to said datum plane than said steep tooth flanks, the angle of said steep tooth flanks with respect to said datum plane being of a degree sufficient to cause said teeth on the cutter carrier and tool body to be pressed toward the engaging position when the cutting tool is in use and minimize tipping of said cutter carrier with respect to the tool body.

2. The tool as claimed in claim 1, wherein said steep tooth flanks extend perpendicularly to said datum plane of the bearing surface.

3. The tool as claimed in claim 1, wherein the tooth formation is undercut on said steep tooth flanks.

4. The tool as claimed in claim 3, wherein the angle of said undercut in relation to a line perpendicular to said datum plane of the bearing surface lies in the range of up to substantially 8°.

5. The tool as claimed in claim 4, wherein said undercut angle is substantially 5°.

6. The tool according to claim 1, wherein the angle of inclination of the inclined tooth flanks in relation to a line perpendicular to said datum plane of the bearing surface lies in a range between 40° and 50°.

7. The tool as claimed in claim 6, wherein said angle of inclination is approximately 45°.

8. The tool as claimed in claim 1, wherein the teeth of at least one of the tooth formations are truncated.

9. The tool as claimed in claim 1 wherein:
the tooth formation of said tool body comprises two tooth formations on directly adjacent bearing surfaces, the steep flanks of each tooth formation facing toward each other; and
said at least one cutter carrier comprises two adjustable cutter carriers and respective oblong holes, clamping screws and cooperating threaded holes in the tool body.

10. The tool as claimed in claim 1 and further comprising:
a cylindrical counterbored seat at the outer end of said clamping screw threaded hole in the tool body adjacent said bearing surface;
a cylindrical sleeve in said cylindrical seat rotatably receiving said shank of the clamping screw therein and extending into said at least one carrier cutter;
a fine adjustment screw threaded hole in said at least one carrier cutter having its axis extending substantially perpendicular to the axis of said clamping screw; and
a fine adjustment screw operatively engaged in said fine adjustment screw threaded hole and having an inner end engageable against said cylindrical sleeve for fine radial adjustment of said at least one cutter carrier by rotation of said fine adjustment screw.

11. The tool according to claim 1, wherein the angle of inclination of the inclined tooth flanks in relation to a line perpendicular to said datum plane of the bearing surface lies in a range between 40° and 50°.

12. The tool as claimed in claim 11, wherein the teeth of at least one of the tooth formations are truncated.

13. The tool as claimed in claim 12 wherein:
the tooth formation on said tool body comprises two tooth formations on directly adjacent bearing surfaces, the steep flanks of each tooth formation facing toward each other; and
said at least one cutter carrier comprises two adjustable cutter carriers and respective oblong holes, clamping screws and cooperating threaded holes in the tool body.

14. The tool as claimed in claim 13 and further comprising:
a cylindrical counterbored seat at the outer end of each clamping screw threaded hole in the tool body adjacent said bearing surface;
a cylindrical sleeve in each cylindrical seat rotatably receiving said shank of each clamping screw therein and extending into each cutter carrier;

a fine adjustment screw threaded hole in each cutter carrier having its axis extending substantially perpendicular to the axis of the respective clamping screw; and a fine adjustment screw operatively engaged in each fine adjustment screw threaded hole and having an inner end engageable against the respective cylindrical sleeve for fine adjustment of each cutter carrier by rotation of the respective fine adjustment screw.

* * * * *